E. CRAIG.
BOX BLANK MACHINE.
APPLICATION FILED SEPT. 13, 1919.

1,384,239.

Patented July 12, 1921.
9 SHEETS—SHEET 5.

Inventor
Edward Craig
By Arthur H. Durand
Atty

E. CRAIG.
BOX BLANK MACHINE.
APPLICATION FILED SEPT. 13, 1919.

1,384,239.

Patented July 12, 1921.
9 SHEETS—SHEET 6.

Inventor
Edward Craig
By Arthur F. Durand
Atty

E. CRAIG.
BOX BLANK MACHINE.
APPLICATION FILED SEPT. 13, 1919.

1,384,239.

Patented July 12, 1921.
9 SHEETS—SHEET 7.

Inventor
Edward Craig

E. CRAIG.
BOX BLANK MACHINE.
APPLICATION FILED SEPT. 13, 1919.

1,384,239.

Patented July 12, 1921.

Inventor
Edward Craig
By: Arthur H. Durand
Atty

UNITED STATES PATENT OFFICE.

EDWARD CRAIG, OF ST. JOSEPH, MICHIGAN.

BOX-BLANK MACHINE.

1,384,239.  Specification of Letters Patent. Patented July 12, 1921.

Application filed September 13, 1919. Serial No. 323,494.

*To all whom it may concern:*

Be it known that I, EDWARD CRAIG, a citizen of the United States of America, and a resident of St. Joseph, Michigan, have invented a certain new and useful Improvement in Box-Blank Machines, of which the following is a specification.

This invention relates to box blanking machines for making wire bound box blanks, and is in the nature of an improvement on the machine shown and described in Patent #1258989, granted March 12, 1918.

One of the objects of the invention forming the present improvement is to obviate the necessity of controlling the staplers by means having direct contact with the cleats or sheets or any other portions of the blank materials, whereby such control will be exercised regardless of whether any such materials are being carried through the machine. In other words, the control exercised over the staplers for the purpose of changing from long staples to short staples, and vice versa, or for the purpose of preventing the driving of staples between blanks, is not in any way dependent upon the materials from which the blanks are made, in the production of wire bound box blanks of this character.

It is also an object to provide certain details and features of construction and combinations tending to increase the general efficiency and the desirability of a box blank machine of this particular character.

To these and other useful ends the invention consists in matters hereinafter set forth and claimed, and shown in the accompanying drawings, in which—

Fig. 2 is a plan of said machine.

Figure 17:
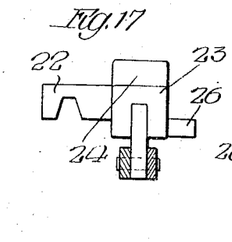
Figures 18, 19, 20:
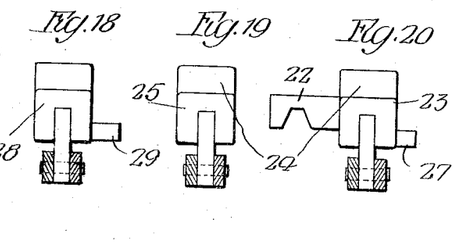
Figure 21:
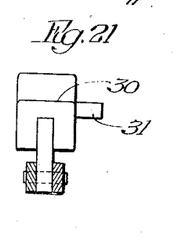
Figure 26:
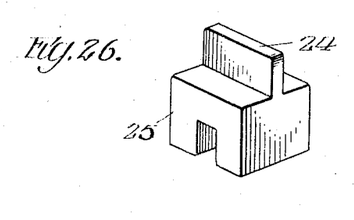
Fig. 26 is a perspective of one of another kind of blocks carried on said feed belts.

As thus illustrated, the invention comprises a body frame composed of parallel side members 1, supported on uprights 2, of any suitable character, and the castings 3 at one end of the machine. Sprocket wheels 4 and 5 are suitably mounted at opposite ends of the body frame, and endless link belts are supported on such sprocket wheels to travel horizontally and longitudinally of the machine. The sprocket wheels 4 are carried by a shaft 6 which is mounted in bearings 7 slidably supported on the longitudinal side bars 8, and these bearings are adjustable by means of screws 9, in the usual manner, so that the link belts can be tightened to give them the proper stretch or tension. The sprocket wheels 5 are rotated in a step by step manner by a ratchet device 10 which latter is operated in a suitable or well known manner, preferably by an eccentric connection with the main driving shaft 11 which is mounted in bearings on the upright castings 3 near the bottom of the machine. In this way, the two feed belts 5, which are spaced a suitable distance apart, are given the proper motion for feeding the blank materials forward. The two link belts 5 preferably slide in channel guides 12 which extend longitudinally of the machine, and outside of these guides channel irons 13 are arranged to extend longitudinally of the machine. The blanks to be made, as explained in said prior patent, comprise four sections 14, 15, 16 and 17 of veneer or other sheet material, with cleats 18 secured to the under surface of section 14 and similar cleats 19 secured to the under surface of the section 16, together with binding wires 20 and 21 by which the four sections of the blank are flexibly connected together in the usual and well known manner. The cleats 18 and 19 slide in the channel guides 13, and are propelled by the fingers 22 which are carried by the feed blocks 23, the latter being adjustably secured to the chains or link belts 5 by means of set screws or any other suitable means. With this arrangement, said fingers are shaped to reach across the guides 13, and to extend downward therein a distance thereby to engage the rear ends of the cleats 18 and 19; and, in addition, the blocks 23 have upstanding portions 24 which engage the rear edges of the sheets of veneer or other sheet material to carry the latter forward. Some of the feed blocks 25 do not need the feed fingers 22, and are of the character shown in Fig. 26. Also, some of the blocks 23 have cams 26, and some of them have cams 27, as shown in Figs. 17 and 20, for a purpose that will hereinafter more fully appear. Also, there are some blocks 28 which have cams 29, and there are other blocks 30 which have cams 31, for a purpose which will hereinafter more fully appear. As is obvious, of course, any suitable known or approved means can be employed to hold the sheets and cleats down and against rising from the guides and feed belts during the operation of the machine, and while the work is traveling forward below the staplers.

Figure 22:
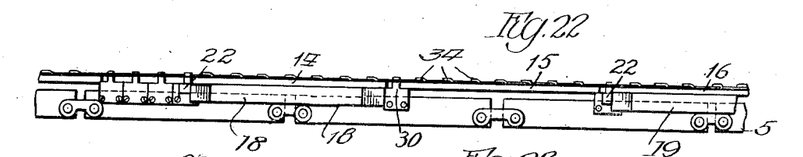
Fig. 22 is an enlarged side elevation of said endless link feed belt, showing blank materials thereon.
Figure 23:
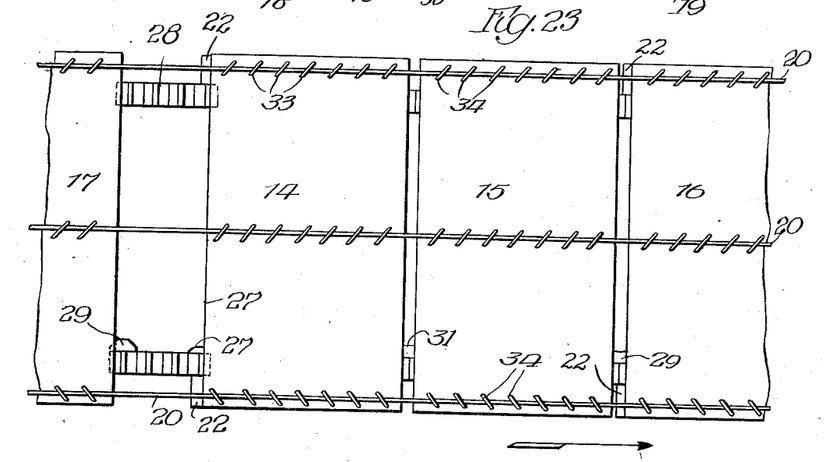
Fig. 23 is a plan of the elements shown in Fig. 22.
Figures 24, 25:
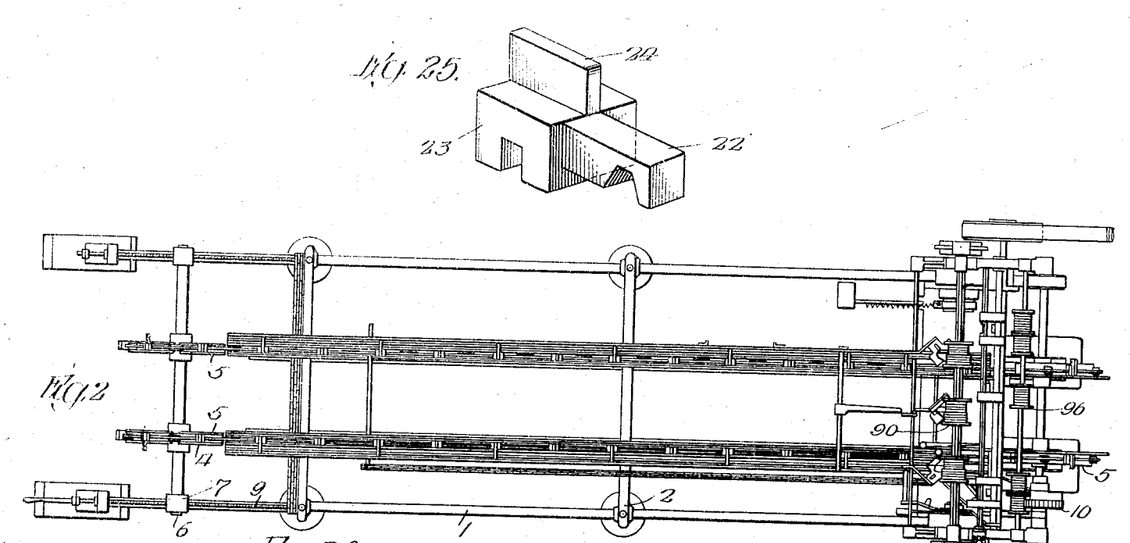
Fig. 24 is a perspective of one of the completed box blanks, showing the under side thereof.
Fig. 25 is a perspective of one of the feed and positioning blocks carried on one of the endless link feed belts.
Figure 24:
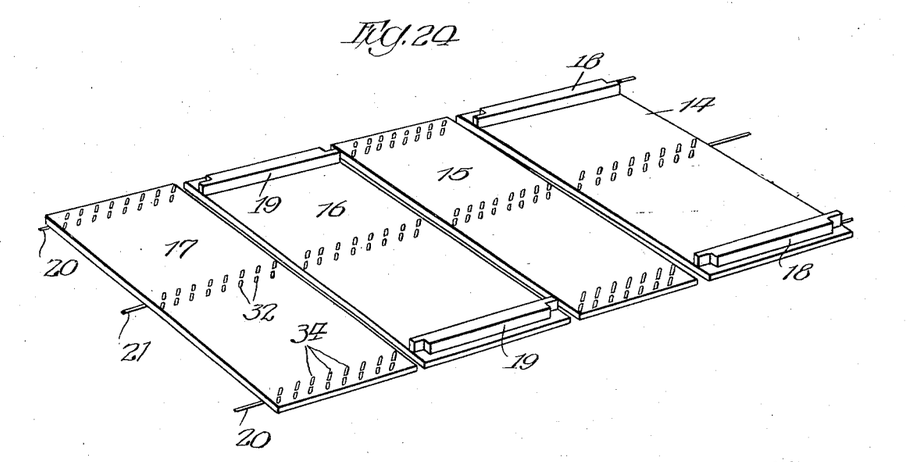

With the work feeding means thus constructed, the cleats and sheets are carried forward in the manner described, as illustrated Figs. 22 and 23, preferably with the edges of the sheets of veneer slightly separated by the upstanding portions 24 with which all of the feed blocks are provided.

The stapling means and devices are as follows:

The two upright castings 3 are connected together, in the usual manner, by a stationary cross bar upon which the three stapler units are mounted. The stapler for driving the staples 32 by which the central wire 21 is secured in place may be any suitable or ordinary stapler as the staples for this purpose are all of the same length. Obviously, however, the wires 20 must be secured in place by long staples 33 that are long enough to extend through the sheet material and into the cleats 18 and 19, and by short staples 34 which are only long enough to extend through the sections 15 and 17, which have no cleats. Therefore, each stapler unit for driving the staples 33 and 34 must have one set of instrumentalities for making and forming the long staples and another set of instrumentalities for making and driving the short staples. These staple forming and driving devices are preferably of the character shown in Figs. 14 to 17, inclusive, of said prior patent, and as shown in Figs. 11 to 14 of the accompanying drawings, and will require only a brief description, as follows:

A narrow staple former (35) is provided for cutting off a short length of wire to form the short staples, and a wide staple former (36) is provided for cutting off a longer length of wire for the longer staples; and these two staple formers are connected by springs (37) and (38) to the vertically reciprocating bar (39), which forms the usual crosshead in a stapling machine of this general character, so that the staple formers are yieldably pressed down upon the work, during the insertion of the staples, in the usual and well known manner. The two staple formers are arranged flatwise together, and are disposed between the staple drivers (40) and (41), which latter are connected to the bracket (42) which is rigidly connected to cross bar (39), so that these staple drivers are reciprocated vertically in the well known manner. Wire for the short staples is fed through a tube (43), below the staple former (35), and wire for the long staples is fed through a tube (44) below the staple former (36). The two staple formers and drivers reciprocate up and down in unison, and whether a long staple or a short staple is made, depends upon whether the wire is fed through the tube (44) or the tube (43), as will hereinafter more fully appear. The latches (45) and (46) lock the staple formers to the staple drivers, in the usual and well known manner, and are operated by the stationary cams (47) and (48), to release the staple formers from the drivers, so that the latter will continue to slide downward after the staple formers have come to rest on the upper surface of the work. The loop-bars or anvils (49) and (50) are pivoted at (51) and (52), so that their lower ends may swing into position to support the wire below the staple formers, and are operated by the cams (53) and (54) on the staple drivers. In this way, the two anvils automatically swing into position to support the wire, and then swing out of the way of the drivers as soon as the cams (53) and (54) pass downward and disengage the upper ends of said loop-bars, so that the lower ends of the latter are permitted to swing outward by gravity, thus permitting the drivers to push the staples downward and into the work.

The means for feeding the wire from which the staples are made is as follows:

The transverse shaft (55) is suitably mounted in bearings on the body frame of the machine and have the relatively large and small feed rollers (56) and (57) loosely mounted thereon and provided with ratchet wheels (58) and (59) to be engaged by their respective dogs or pawls (60) and (61), the latter being carried on cranks (62) and (63) mounted on the shaft (64) that extends transversely of the machine. Idler rolls (65) and (66) engage the feed wheels (56) and (57) respectively, these rolls being grooved, as shown, to feed the wire into the tubes (43) and (44) previously described; it will be understood that wire is fed from the rolls (57) and (66) to the tube (43), for the short staples, and between the rolls (56) and (65) to the tube (44) for the long staples. Springs (67) and (68), employed in the ordinary or any suitable manner, serve to yieldingly press the rolls (65) and (66) against the lower side of the feed rolls (56) and (57), the roll (57) being smaller than the roll (56) in order to feed a shorter length of wire. The shaft (64) is rocked by a crank arm (69) which is actuated by a pitman (70), the latter being reciprocated up and down by a suitable eccentric or cam device on the main shaft (11) in a manner that will be readily understood. The dogs or pawls (60) and (61) are yieldingly held against the ratchet wheels by spring devices (71), in a manner that will be readily understood; and, with this arrangement the rocking motion of the shaft (64) will cause the said dogs or pawls to actuate the ratchet wheels, thereby actuating the feed rolls which feed the wire to the staplers. A rocking shaft (72) extends transversely of the machine directly in front of the said dogs or pawls, and is provided with cams (73) and (74) for engaging said dogs or pawls, so that when this shaft (72) is rocked in either direction, one pawl will be thrown out of engagement with its ratchet wheel, and the other pawl will be brought into engagement with its respective ratchet wheel; and, also, when the shaft (72) is rocked to an intermediate position, both pawls will then be out of engagement with their respective ratchet wheels. The means for rocking the shaft (72) comprises a bevel gear connection (75) with a vertical shaft (76), the latter having a pinion (77) near the lower end thereof, and being mounted in suitable bearings on the side of the body frame. Transversely arranged racks (78) and (79) engage opposite sides of the pinion (77), and are connected respectively with the upper and lower levers (80) and (81) which are pivoted at (82) on a stationary portion of the body frame. These levers (80) and (81) have rollers (83) and (84) at their shorter ends, the roller (83) being in a position to engage the cams (31) previously described, and the roller (84) being in a position to engage the cams (26), (27) and (29) previously described; and with this arrangement, when the lever (81) is actuated by one of the cams (26) or (29), the shaft (72) is then rocked into such a position that the cams (73) and (74) control the ratchet feed mechanism in such a manner that only wire for the short staples will be fed to the two outer stapler units; and in a similar way, when the lever (80) is actuated by any cam (31) the shaft (72) is then rocked in the opposite direction and causes the cams (73) and (74) to control the ratchet feed mechanism in such a manner that only wire for the long staples will be fed to the said stapler units. When the lever (81) is actuated by one of the short cams (27) the shaft (72) is only rocked to a middle or intermediate position, leaving both of the dogs (60) and (61) out of engagement with their respective ratchet wheels, so that no wire whatever is fed to the staplers, with the result that no staples of any kind are made or driven while the space between the blanks, (as shown for example in Figs. (22) and (23)), is passing under the staplers. It will be understood that a suitable wire feeding device is provided for the ordinary stapler which drives the staples (32), and that this feeding device may be controlled in a similar manner, by the rocking of the shaft (72), thereby to prevent this feeding device from feeding any wire to the middle stapler while said space between blanks is passing under the three stapler units; it will also be understood, of course, that the center wire (21)

can be omitted, if this is desired, and that in such event the middle stapler which, of course, makes and drives only short staples, will be omitted. While the shaft (72) is being rocked from one extreme position to the other, in order to change from long staples to short, or vice versa, there is an intermediate position, of course, during which both of the dogs or pawls (60) and (61) are out of engagement with their respective ratchet wheels, and in this way, and by properly gaging this period of time, no staple will be driven in the little spaces between the edges of the sections of the same box blank. In other words, the staplers will skip the spaces between the sections (14) (15) (16) and (17), and will also skip the larger spaces between blanks, these larger spaces being necessary in order to provide wire ends of suitable length for the binding wires, so that these ends can be twisted together in closing the box. In skipping a space between blanks, the cam (27), which is one of the blocks (23) at the rear edge of the blank, actuates the lever (81) to partially rock the shaft (72), with the result, as explained, that no staples are driven while the space between this blank and the next one is passing under the staplers; but before the next blank is reached the cam (29) on one of the blocks (28) actuates this lever (81) a little farther, thus rocking the shaft (72) into the position necessary to cause the making and driving of the short staples, which latter are necessary for the oncoming first section (17) of the next blank, as this section has no cleats. Before the next section of the blank is reached, the cam (31) actuates the lever (80), thus controlling the staplers to drive the long staples in the section (16) which has no cleats on the under side thereof; and, in this way, the staplers are controlled to not only drive first short and then long staples, but also to skip the spaces between sections of the blank, and to skip the wider spaces between blanks. It will be observed that the staples (34) are driven a little farther from the side edges of the blank than are the staples (33), as explained in said prior patent.

Figures 1, 15, 16:
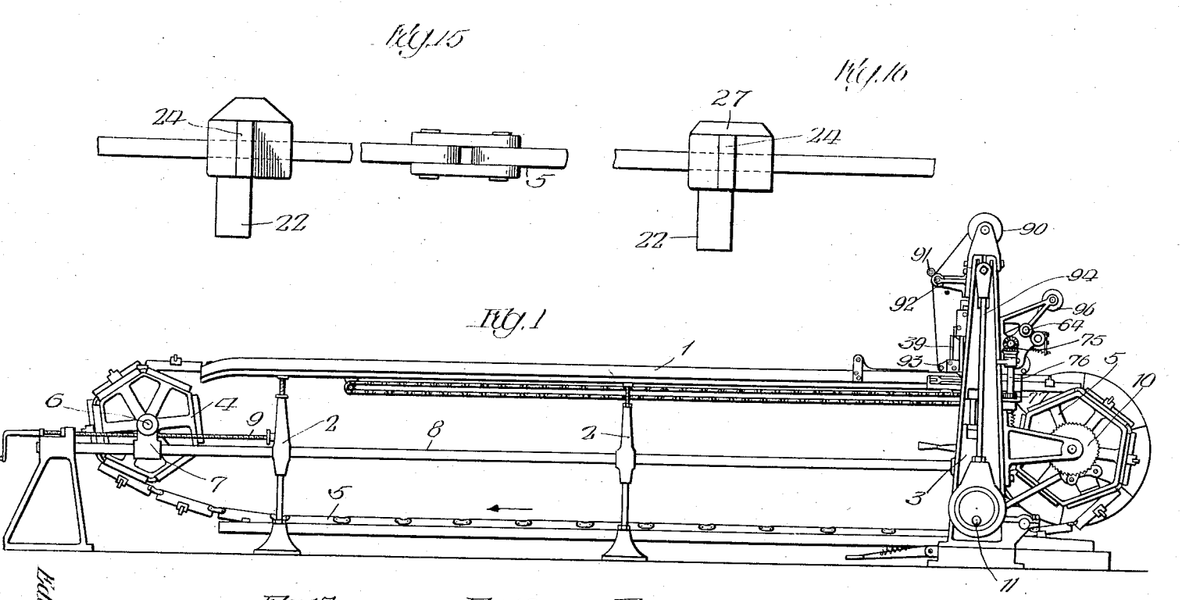
Figure 1 is a side elevation of a box blank machine embodying the principles of the invention.
Figs. 15 to 21 inclusive are detail views of the different blocks or devices employed on one of the endless link feed belts to not only feed the materials forward under the staplers, but also to actuate the devices which control the cams shown in Fig. 10, thereby to automatically control the feeding of the wire to the staplers.
Figure 3:
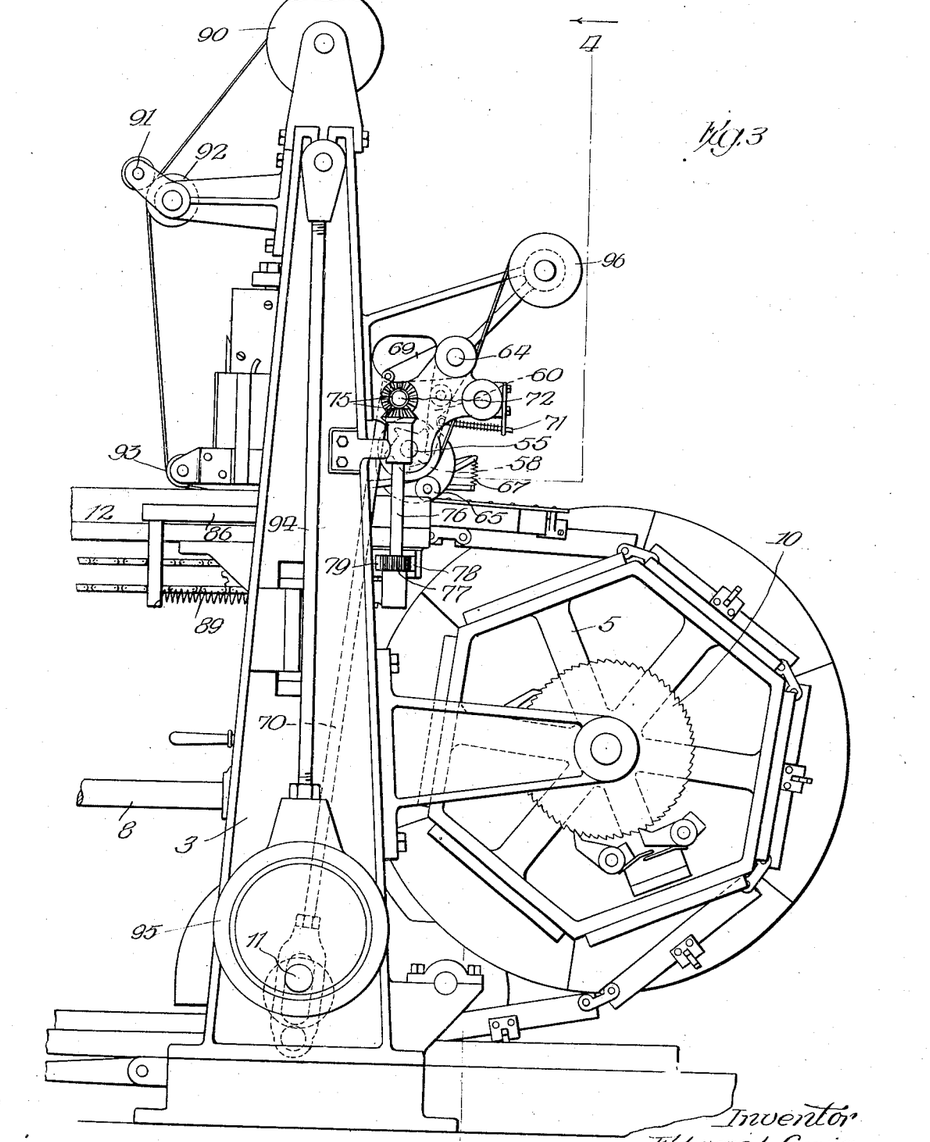
Fig. 3 is an enlarged side elevation of the right-hand end portion of said machine.
Figure 4:
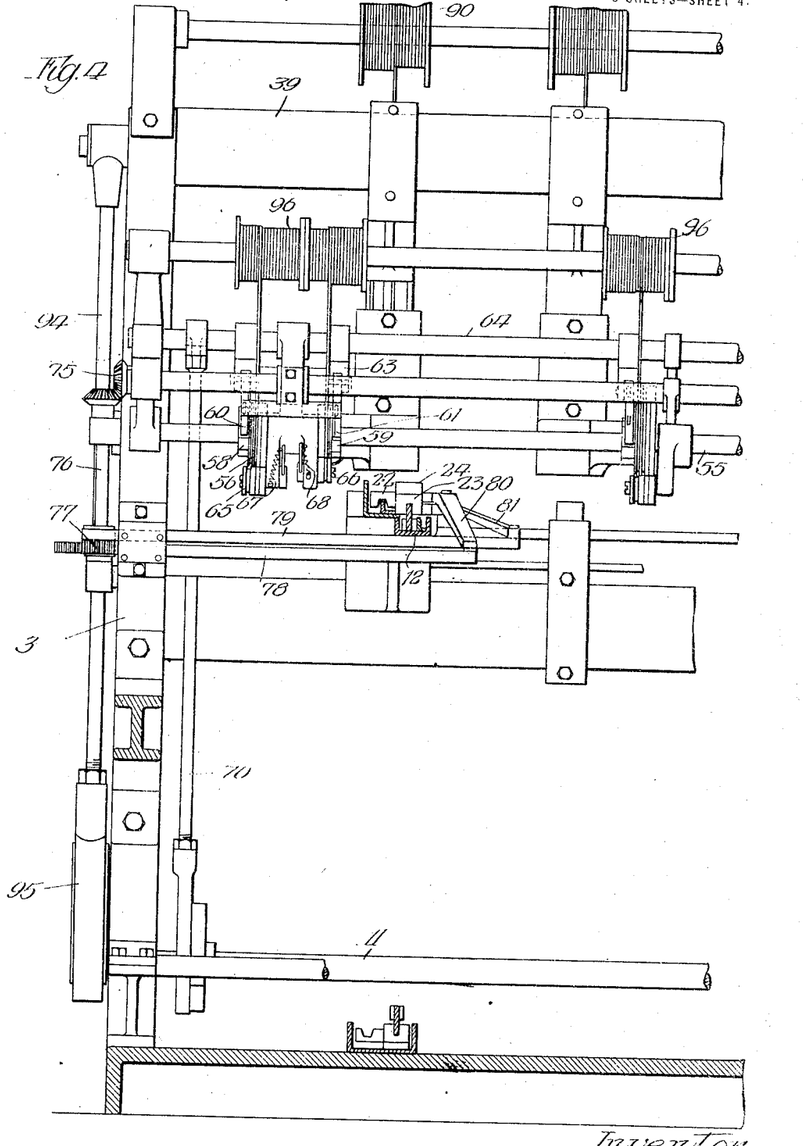
Fig. 4 is a vertical section on line 4—4 in Fig. 3.
Figure 5:
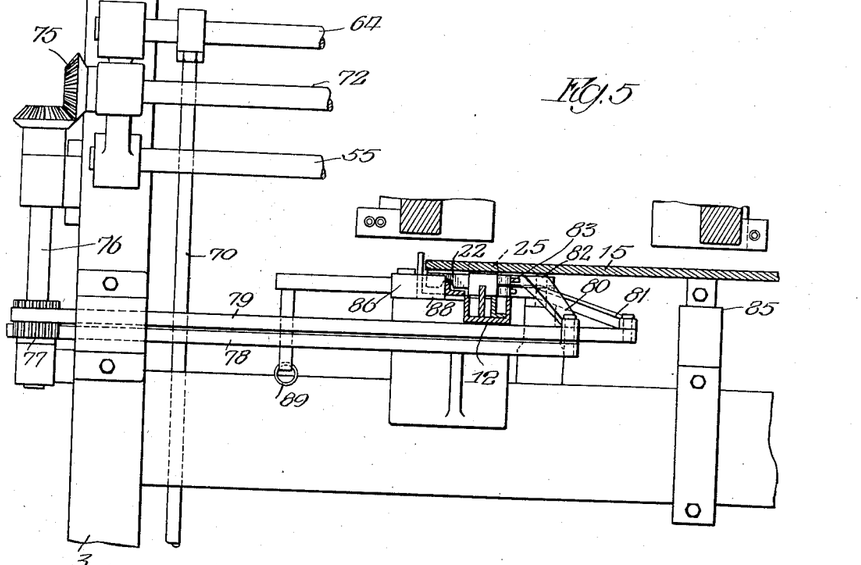
Fig. 5 is a detail and fragmentary view of a portion of the machine, showing certain portions in vertical section.
Figure 6:
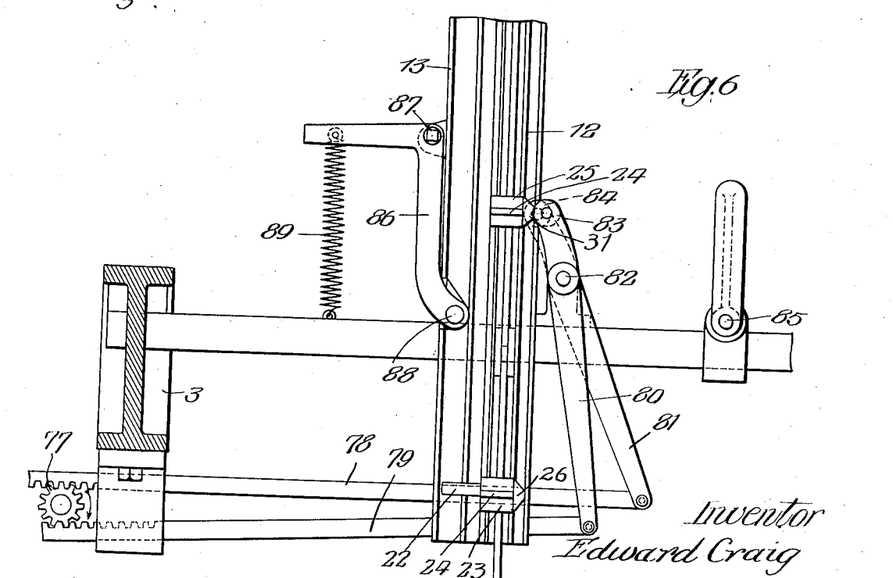
Fig. 6 is a plan of the parts shown in Fig. 5.
Figure 7:
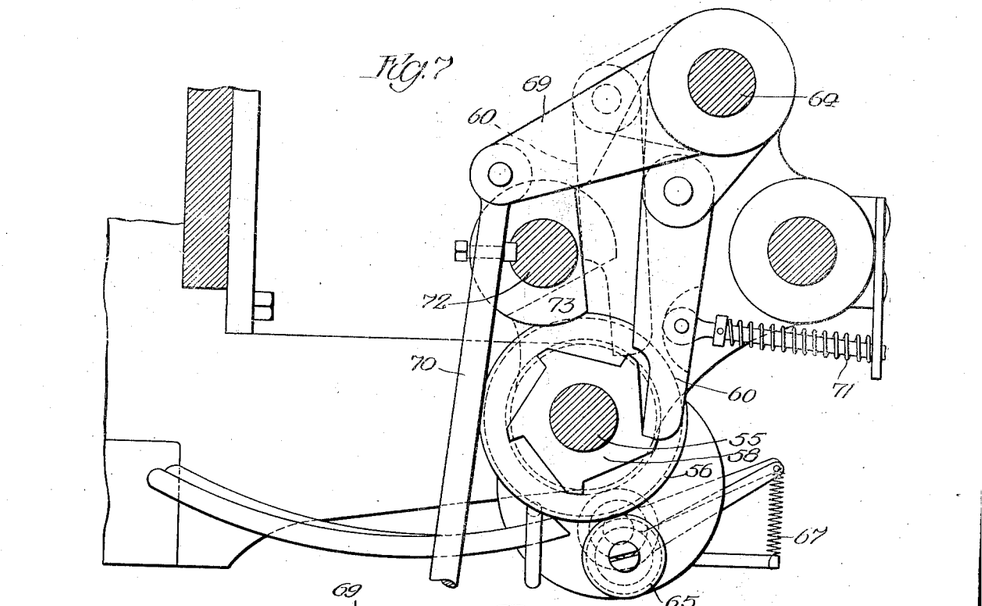
Fig. 7 is an enlarged detail sectional view showing the ratchet mechanism by which the wire is fed to the staplers.
Figure 8:
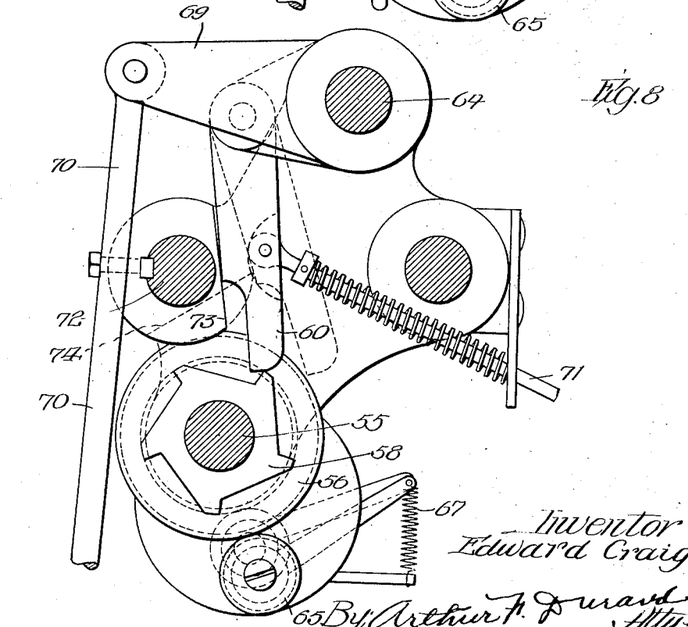
Fig. 8 is a similar view showing said mechanism in a different position.
Figure 9:
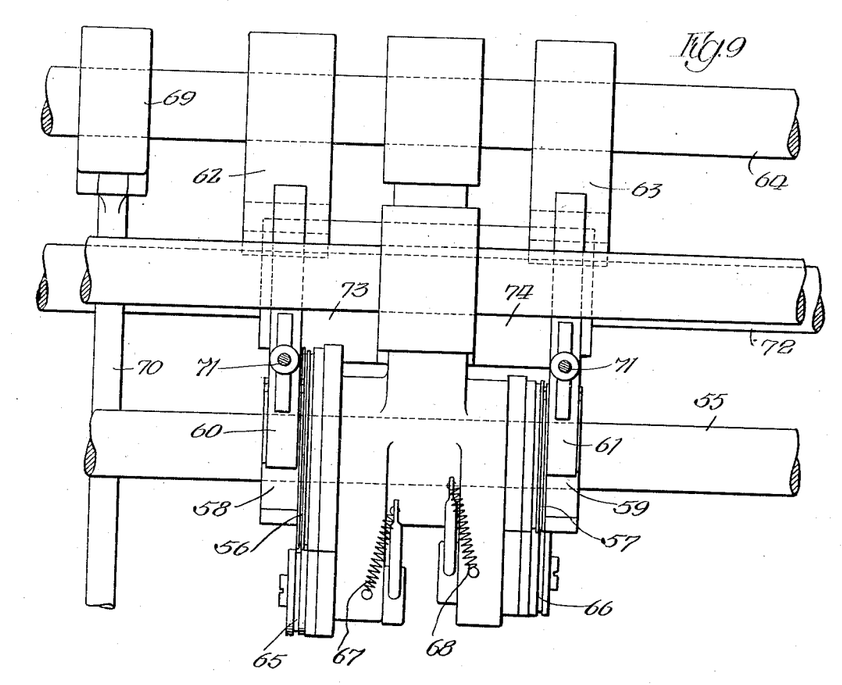
Fig. 9 is a rear elevation of said feed mechanism.
Figure 10:
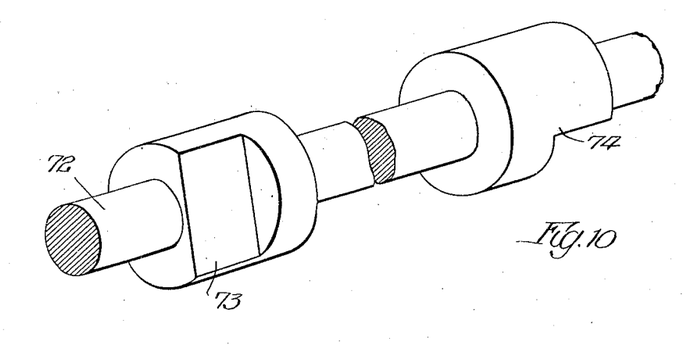
Fig. 10 is a perspective of the two cams which automatically control the feed mechanism and thereby control the feeding of the wire to the staplers.
Figure 11:
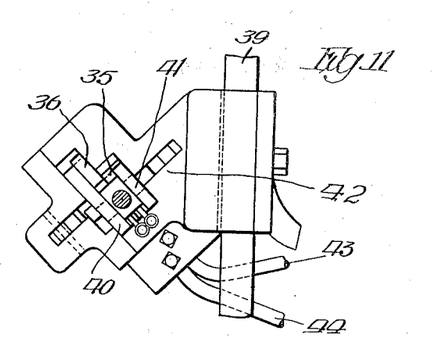
Fig. 11 is an enlarged plan view of one of the stapler units, each unit, as shown and described in said prior patent, comprising one set of instrumentalities for making and driving a long staple and a second set of instrumentalities for making and driving a short staple.
Figures 12, 13:
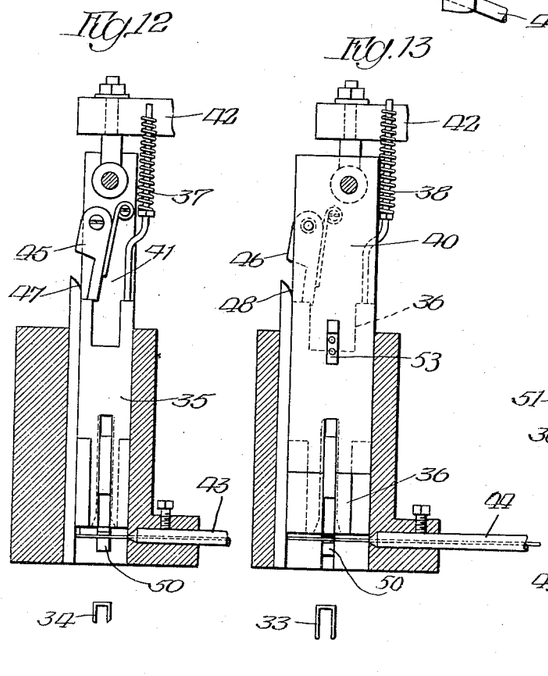
Figs. 12, 13 and 14 are detail sectional views, in vertical planes, of said stapler unit.
Figure 14:
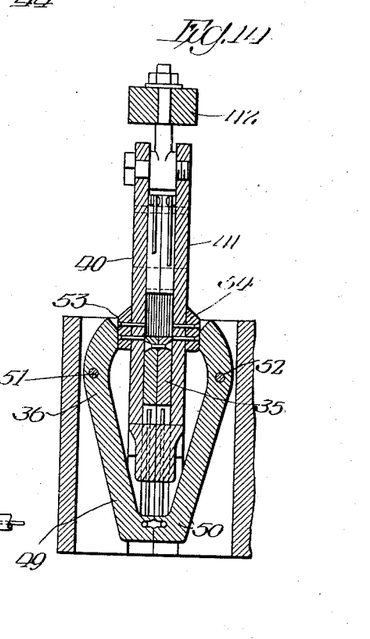

An anvil or clench block 85 is arranged in a position to bend or clench the points of the staples 32, as the blank materials travel forward under the staples; and, for the purpose of clenching the points of the staples 34 pivoted members 86, one at each side of the machine, it will be understood, are provided and pivoted at 87 on the sides of the channel guides 13 in which the cleats 18 and 19 slide forward when the machine is in operation. These members 86 have end portions 88 that project into the guides 13, thereby to support the cleatless edge portions of the sections 15 and 17 of each blank, and to clench the short staples 34 by which the binding wires 20 are secured to these particular sections of each blank. Springs 89 are suitably applied to the members 86, thus to yieldingly hold their operative end portions 88 in the guides 13, as shown in Fig. 6; but the front ends of the oncoming cleats will bump against these inwardly curved portions 88 and push the latter outwardly from the guides, so that the cleats may pass and continue on their way below the staplers. These members 86, it will be seen, are similar to those employed for this purpose in said prior patent, but do not exercise any control over the staplers, their sole function being to clench or bend the points of the short staples. In this way, therefore, the two levers 80 and 81 entirely control the staplers, or the action of the staplers, for the purpose of changing the staples from long to short and vice versa, and for the purpose of skipping spaces in the work as previously explained; and this control of the operation or action of the staplers is obtained, therefore, through the medium of instrumentalities which engage the cams on the traveling work holder, whereby no contact with the cleats or other materials is necessary in order to obtain the said control thus exercised over the staplers; and with this construction and method of operation the said control of the staplers is, therefore, exercised regardless of whether any work is being carried through the machine, as without any materials whatever the step-by-step operation of the traveling work holder comprising the endless link belts would control the action of the staplers in the desired manner, so that the automatic control of the staplers is not dependent in any way upon the blank materials, notwithstanding that such control is, of course, with reference to the particular arrangement of the blank materials on the traveling work holder.

It will be understood, of course, that the different feed blocks and the cams previously described, as shown in Figs. 17 to 21 inclusive, are adjustable along the length of the link belt, so that blanks of different lengths can be made. As is common in machines of this general class, the width of the blanks can be changed by employing suitable provisions for varying the distance between the two endless link belts, and by lateral adjustment of the staplers, in the well known manner. The wire for the blanks may be conveniently carried on reels 90, in the ordinary manner, and guided by grooved rollers 91, 92 and 93 to the point where each wire bends forward to rest flatwise on the top of the blank and in this way the binding wires are guided to the points where they are stapled to the upper surface of each blank. As the blanks emerge from the machine they are separated, by cutting the binding wires between the blanks, in the usual or any suitable manner. The reciprocating crosshead 39 of the staplers can be actuated up and down in the usual manner, by pitmen 94 connected to eccentric devices 95 on the main drive shaft 11, and the different parts are so timed in their operations, of course, that the staples are driven while the box blank materials are standing still, and the work is fed forward while the staple drivers and staple formers are in their raised positions, the work coming to a standstill at about the time, or a little before, the points of the staples are just about ready to enter the work. The wire for the staples may be conveniently carried on reels 96 suitably mounted on the machine, so that each wire will be fed to its allotted guide tube by which it is then guided below the staple former and staple driver of the stapling mechanism. It will be understood, of course, that both chains or link belts of the endless traveling work holder are equipped with the feed blocks 25, and also with the feed blocks 23, and that only the one belt which is adjacent the levers 80 and 81 is equipped with the blocks which have the cams 26, 27, 29 and 31, inasmuch as these cams are not necessary on the other side of the machine; all of the staplers being controlled by the single rock shaft 72, which extends transversely of the machine.

Figure 27:
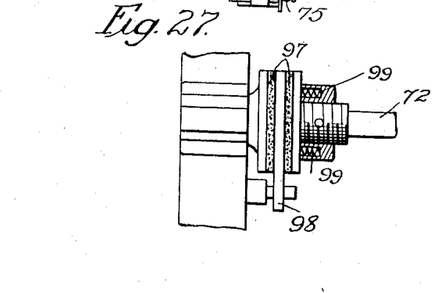
Fig. 27 shows a friction brake device for the cam shaft hereinafter described.

In Fig. 27 the shaft 72 has a pair of leather disks 97 which bear against the stationary disk 98, being yieldingly held in this relation by the springs 99, so that the rotation of the shaft 72 is retarded, thus preventing it from rotating too far at any time.

Figure 28:
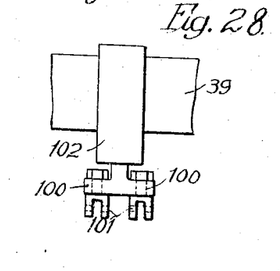
Fig. 28 shows a modification of the connection between the staplers and the crosshead by which they are operated.

In Fig. 28 the vertically reciprocating cross-head or beam 39 is connected by vertical pivots or swivels 100 with the staple drivers of the two outside stapler units, one driver being for the insertion of the long staples and the other driver being for the insertion of the short staples, as previously described. These swivels are in the form of bolts having their lower ends provided with eyes 101 to which the staple drivers are connected, so that a vertical pivot and a horizontal pivot are provided between each driver and the casting 102 which is carried by the bar 39, which enables the two staple drivers to have a sort of self-adjusting action to allow for non-alinement or inaccuracy in the assembling of the parts, as each driver is adjustable about a vertical axis as well as a horizontal axis, as will be readily understood.

Never, however, are both swivels 100 subject to driving strain at the same time, as the two devices alternate in driving the staples, one or more staples being driven by each driver before any staples are driven by the other driver. Thus the feeding motion of the materials exercises full control over the stapling mechanism, for completely stopping the driving of staples at intervals in the work, as well as for changing the length thereof, so that the control for both purposes is independent of the materials.

What I claim as my invention is:—

1. A machine for making folding box-blanks by attaching wires and cleats to sheet material, comprising means to feed the cleats and sheet material forward, with the cleats omitted at intervals on each blank, mechanism to staple the wires to the sheet material and cleats, cams on said means, and devices associated with said means and periodically operated by said cams during the forward feeding movements of the sheets and cleats for automatically controlling said mechanism to drive long staples into the cleats and short staples where the cleats are omitted.

2. A structure as specified in claim 1, said devices comprising a pair of pivoted levers having means to engage said cams.

3. A structure as specified in claim 1, said means including blanks to engage the cleats and sheet, and said cams being carried on said blanks.

4. A structure as specified in claim 1, including other cams on said means to operate said device to prevent the driving of staples between the blanks.

5. A machine for making foldable box-blanks by attaching wires and cleats to sheet material, comprising means to feed the cleats and sheet material forward, with the cleats omitted at intervals on each blank, stationary mechanism to staple the wires to the sheet material and cleats, and devices associated with said means and periodically operated during the forward feeding movements of the sheets and cleats for automatically controlling said mechanism to drive long staples into the cleats and short staples where the cleats are omitted, said mechanism having one set of elements to make and drive the long staples and another set of elements to make and drive the short staples, said devices being operable by said means regardless of whether any cleats are on the machine.

6. A structure as specified in claim 5, in combination with instrumentalities also operated by said means to prevent the driving of staples between the blanks.

7. A structure as specified in claim 5, said devices comprising a pivoted lever operated by said means to stop the driving of long staples and start the driving of short staples, and another lever operated by said means to discontinue the short staples and cause the driving of the long staples.

8. A structure as specified in claim 5, all of said staple forming and driving elements being actuated regardless of whether long or short staples are being driven.

9. A machine for making foldable box-blanks by attaching wires and cleats to sheet material, comprising means to feed the cleats and sheet material forward, with the cleats omitted at intervals on each blank, mechanism to staple the wires to the sheet material and cleats, and devices for automatically controlling said mechanism to drive long staples into the cleats and short staples where the cleats are omitted, said mechanism being constructed to insert the short staples at points farther inward from the side edges of the blanks than the long staples, and means movable into the path of the cleats to clench the staples where the cleats are omitted.

10. A machine for making foldable box blanks by attaching wires and cleats to sheet material, comprising means to feed the cleats and sheet material forward, with the cleats omitted at intervals on each blank, mechanism to staple the wires to the sheet material and cleats, and devices associated with said means and periodically operated during the forward feeding movements of the sheets and cleats for automatically controlling said mechanism to drive long staples into the cleats and short staples where the cleats are omitted, and means movable into the path of the cleats to clench the staples in the spaces where the cleats are omitted from each blank.

11. A machine for making foldable box-blanks by attaching wires and cleats to sheet material, comprising means to feed the cleats and sheet material forward, with the cleats omitted at intervals on each blank, mechanism to staple the wires to the sheet material and cleats, and devices for automatically controlling said mechanism to drive long staples into the cleats and short staples where the cleats are omitted, said devices including means to feed different lengths of wire from which to make the staples, and said mechanism having a narrow staple-former to bend the short lengths and a wide staple-former to bend the greater lengths, in combination with means movable into the path of the cleats to clench the short staples.

12. A machine for making foldable box-blanks by attaching wires and cleats to sheet material, comprising means to feed the cleats and sheet material forward, with the cleats omitted at intervals on each blank, and with a space between adjacent blanks, mechanism to staple the wires to the sheet material and cleats, devices associated with said means and periodically operated during the forward feeding movements of the sheets and cleats for automatically controlling said mechanism to drive long staples into the cleats and short staples where the cleats are omitted, and means whereby said devices are controlled by said forward feeding motion to prevent the driving of any staples between blanks, in combination with a member which is movable into the path of the cleats to clench the short staples.

13. A machine for making foldable box-blanks by attaching wires and cleats to sheet material, comprising means to feed the cleats and sheet material forward, with the cleats omitted at intervals on each blank, and with a space between adjacent blanks, mechanism to staple the wires to the sheet material and cleats, devices associated with said means and periodically operated during the forward feeding movements of the sheets and cleats for automatically controlling said mechanism to drive long staples into the cleats and short staples where the cleats are omitted, and means whereby said devices are controlled by said forward feeding motion to prevent the driving of any staples between blanks.

14. A machine for making foldable box-blanks by attaching wires and cleats to sheet material, comprising guides for the cleats, endless link-belts arranged to travel parallel with said guides, means on said belts to engage and carry the sheet material, fingers on said belts to engage the rear ends of the cleats, the fingers of each belt being spaced apart a distance substantially equal to the combined length of two cleats, so that each belt is operative to propel and position cleats for only every other section of the blank, leaving spaces where the cleats are omitted, mechanism to staple the wires to the celats and sheet material, means to clench the staples by clenching operations performed in said spaces, means controlled by one of said belts to automatically control said mechanism to drive long staples into the cleats and short staples where the cleats are omitted, and devices to operate said belts.

15. A machine for making foldable box-blanks by attaching wires and cleats to sheet material, comprising guides for the cleats, endless link belts arranged to travel parallel with said guides, means on said belts to engage and carry the sheet material, fingers on said belts to engage the rear ends of the cleats, the fingers of each belt being spaced apart a distance substantially equal to the combined length of two cleats, so that each belt is operative to propel and position cleats for only every other section of the blank, leaving spaces where the cleats are omitted, stationary mechanism to staple the wires to the cleats and sheet material, devices to inin combination with means also independent of said materials to prevent at intervals the driving of any staples of either length.

29. A structure as specified in claim 26, said controlling means including an intermittently movable means to feed the materials under said mechanism.

30. A structure as specified in claim 26, said controlling means comprising a link belt to feed the materials under said mechanism, in combination with means whereby the feeding motion serves at intervals to prevent said mechanism from driving any staples of either length.

EDWARD CRAIG.